May 10, 1955     G. E. COMSTOCK, 3D     2,708,260

SPEED REGULATION OF ADJUSTABLE-SPEED D. C. MOTORS

Filed Feb. 3, 1954

INVENTOR.
GEORGE E. COMSTOCK 3rd.
BY
*William T. Kniesner*
ATTORNEY

United States Patent Office 2,708,260
Patented May 10, 1955

2,708,260

SPEED REGULATION OF ADJUSTABLE-SPEED
D. C. MOTORS

George E. Comstock 3d, Holden, Mass., assignor to Norton Company, Worcester, Mass., a corporation of Massachusetts Application February 3, 1954, Serial No. 407,909

4 Claims. (Cl. 318—332)

This invention relates to electrical systems and apparatus for providing controllable or adjustable speed-changes in an electric motor.

One of the objects of this invention is to provide a system and apparatus of the above nature in which wide range of motor-speed change may be reliably achieved with satisfactory speed regulation at any selected speed within the desired range. Another object is to carry out this last-mentioned object in a manner, and preferably with static apparatus or devices, to achieve high energy efficiency at reasonable or low equipment and maintenance cost. Another object is to make available, at reasonable cost and with materially improved operating characteristics throughout wider range of control or selectability of speed and at high efficiency, certain advantages of a D. C. drive motor while retaining the advantages therewith of an A. C. primary source of electrical energy such as usual or existing A. C. power supply circuits. Another object is to provide better efficiency and good speed regulation in an adjustable or selectably controllable variable-speed D. C. motor-drive in a system deriving its electrical energy from an A. C. source of supply. Another object is to provide wider range of speed control and more reliable operation in a system of the just-mentioned kind. Another object is in general to make more practicable and to structurally and functionally improve such A. C.-D. C. changeable-speed drive systems. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
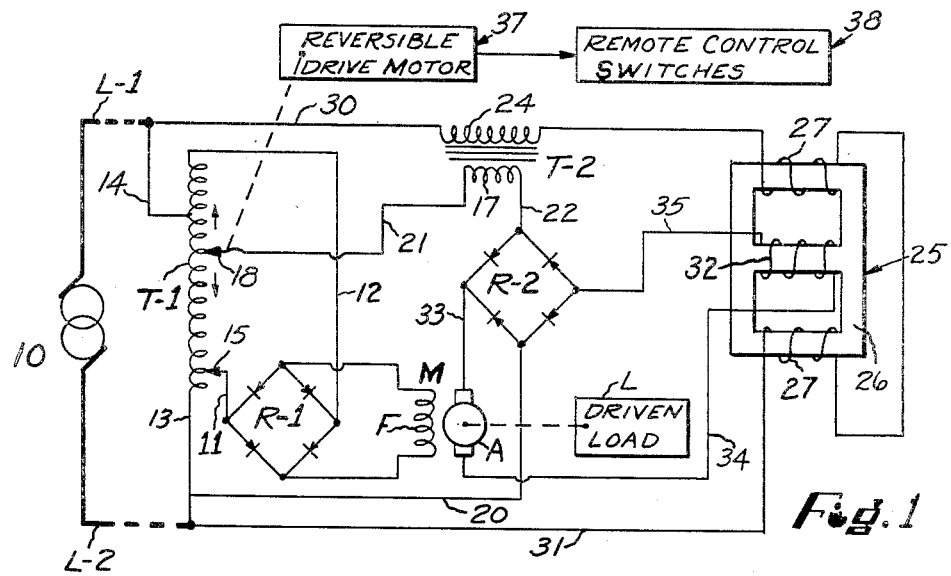
Figure 2:
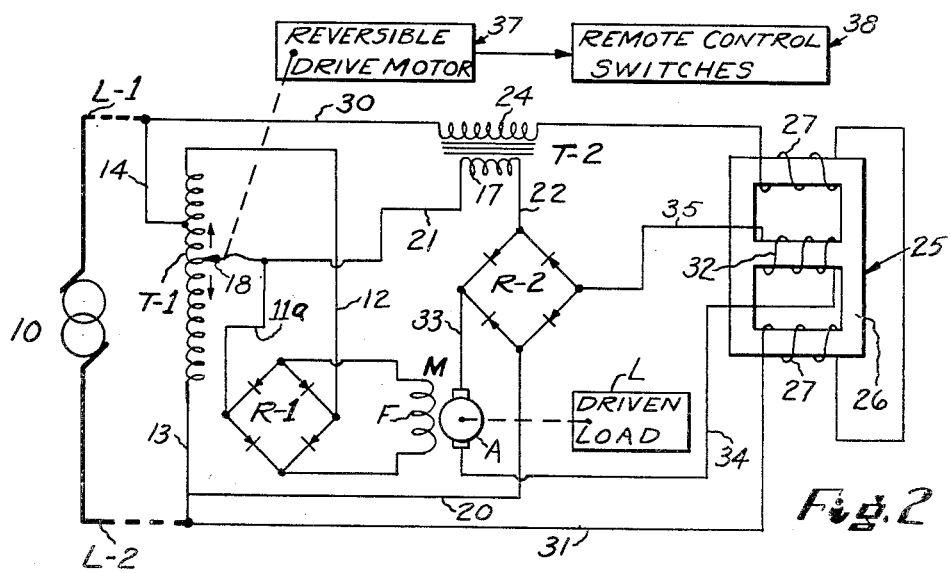

In the accompanying drawing in which are shown illustratively two possible embodiments of my invention, Figure 1 is a diagrammatic representation of a system embodying an adjustable-speed direct-current drive motor deriving initial electrical energy from an A. C. source, and Figure 2 is a diagrammatic representation of a possible modification thereof.

Similar reference characters refer to similar parts throughout the several views of the drawing.

Referring first to Figure 1, conductors L–1 and L–2 represent an A. C. circuit such as a 220 volt, 60 cycle, power line in a factory or the like, supplied with electrical energy from any suitable source as indicated at 10. At L is diagrammatically indicated a mechanical load to be driven at any selectable speed within the required or desired range of speeds, according to circumstances; the load L may take any form, such as a drive spindle of a machine tool, a machine tool feed-shaft, or the like. Load L is driven by a motor M which is desirably and preferably, in order to gain certain features of advantage thereof, a D. C. shunt motor having an armature A, which is in driving connection with load L, and a field winding F. While it has heretofore been proposed to unidirectionally energize, at substantially fixed voltage, field F by way of a transformer and rectifier and to unidirectionally energize, at controllably variable voltage, the armature A by way of a variable-tap transformer and rectifier, such proposed arrangement is inherently defective and gravely inefficient. For example, it is plagued by detrimental effects of voltage-drops in the armature circuit in which the effective armature current, flowing in series through the transformer winding, rectifier, and armature, produces a total voltage drop considerably greater than that in the armature alone; since armature speed decreases directly with the voltage available or supplied to it, poor speed regulation at the intended or selected motor speed results and this is greatly accentuated at the lower available or selected speed settings because the increased armature currents at low speeds, particularly under normal or substantial mechanical loads, greatly increase the IR drops in the transformer winding and in the rectifier with the result that these IR drops, additive in their effects, can become a large fraction of the supply voltage setting on the variable-tap transformer. Not only is speed regulation poor, but also losses are substantial and efficiency is low. Such and other disadvantages and detriments are overcome or greatly alleviated according to this invention, and at the same time the desirable features of A. C. power supply and of the D. C. shunt motor for adjustable or selectably changeable drive retained.

Referring to Figure 1, I provide a full-wave rectifier R–1, which may be of the selenium type, and across its output terminals is connected the shunt field F, while its input terminals are connected by conductors 11 and 12 for A. C. supply from the A. C. power line L–1, L–2 preferably by way of a transformer T–1. Transformer T–1 may be of any suitable construction or arrangement; illustratively it may be, as indicated, an auto-transformer with its primary turns connected to the power line by conductors 13 and 14. In this manner, field F can be supplied with substantially constant unidirectional current and its excitation maintained substantially constant. If desired, the excitation current of the field F of shunt motor M may be manually set, as by tap 15 in line 11, and thereby determine the desired field excitation to be maintained throughout the adjusted speed changes of the motor M.

To unidirectionally energize armature A, I provide a full-wave rectifier R–2, which may also be of the selenium type; its input is supplied, for speed change of the armature A, with controllably variable A. C. energy which is derived from the power line L–1 and L–2 and which is modified automatically in a manner and by means to compensate for the detrimental IR drop effects above noted. Thus, I provide a transformer T–2 whose secondary winding 17 is in series, aiding, with a selectable number of turns of auto-transformer T–1, selectable by shiftable tap 18, and it is these two transformer secondaries that are additively connected to the input terminals of rectifier R–2; the rectifier-input circuit, in the drawing, extends from one terminal of rectifier R–2, conductor 20, conductor 13, through selected portion of the winding of transformer T–1, tap 18, conductor 21, secondary winding 17 of transformer T–2, and then by conductor 22 to the other input terminal of rectifier R–2.

Transformer T–2 has its primary winding 24 energized, through a variable control, from the A. C. supply line L–1, L–2; the variable control preferably comprises a saturable core reactor 25 having a shell-type of core 26 on the outer legs of which are windings 27 connected in series with the primary 24 of transformer T–2, across the A. C. lines L–1, L–2. The circuit extends from line L–1 via conductor 30, primary 24, windings 27, and then by conductor 31 to line L–2. On the middle leg of core 26 is a winding 32 which is unidirectionally energized proportionally to the current flowing to armature A of shunt motor M; thus, it may be in series with the armature A and in that case the circuit is from one D. C. output terminal of rectifier R–2, conductor 33, armature A, conductor 34, winding 32, and by conductor 35 to the other output terminal of rectifier R–2. With this arrangement, transformer T–2 is preferably an insulation transformer and in transformation ratio is appropriately suited to the range of variation in IR drops, mentioned above, which are to be compensated for.

Tap 18 on transformer T–1 is controllable in any suitable manner; it may be manually shifted, automatically shifted, or shifted by any suitable means remotely controllable such as a reversible drive motor and gear schematically indicated at 37 which may be remotely controlled, as for start, stop and reverse, by any suitable means schematically indicated at 38. In such manner, the speed of drive of load L may be changed or selected throughout a wide range, and by this invention, reliably and efficiently realized at the load L.

In operation, at whatever speed is selected by shifting tap 18, so long as values of current flowing to armature A are low, the currents in D. C. reactor winding 32 are low, and flux and saturation curve characteristics of reactor 25 are such that, for these low current values, the impedance of reactor windings 27 is high and, being in series with primary winding 24 of transformer T–2, the resultant impedance drop leaves but little voltage of A. C. line L–1, L–2 to be impressed on primary winding 24 of transformer T–2, with the result that motor M drives load L at the selected speed corresponding to the voltage determined principally by the setting of tap 18 on transformer T–1.

However, should the load L increase for any selected speed, calling for more torque from armature A (torque being a function directly of armature current), the D. C. current in D. C. saturating winding 32 of reactor 25 correspondingly increases and shifts the point on which the A. C. windings 27 function on the core magnetization or saturation curve so as to reduce effective flux linkages therewith, thus commensurately reducing the effective reactance (and impedance) of windings 27 as well as the impedance drop, causing a greater fraction of A. C. line voltage to be effective upon primary winding 24 of transformer T–2 so that secondary winding 17 thereof adds more voltage to the A. C. input of rectifier R–2, and sufficiently so to compensate for the increased IR or impedance drops in transformer T–2 and for increased IR drops in rectifier R–2 due to increase in load L.

Now, should tap 18 be shifted to a lesser voltage point to select a low speed of drive for motor M, thus very materially increasing to a higher standard the needed armature current because of need for more current to meet higher torque demands at lower speed, the increased current through winding 32 of reactor 25 shifts the point of operation on the saturation curve of core 26 to a new standard so that for the corresponding higher standard of armature current demand at the lower speed for a given load at L there is lesser impedance drop in reactor windings 27 and a higher fraction of the A. C. line voltage is impressed on primary of compensating transformer T–2 and again sufficiently so that the corresponding increases in IR drops in transformer T–1 and in rectifier R–2 are adequately or substantially compensated for. And for such new speed standard of operation, armature current changes due to load changes at L are automatically compensated for by core magnetization changes by the same current changes in core winding 32.

Accordingly, at whatever motor speed selected by the setting of tap 18 on transformer T–1, good speed regulation, for load changes at L, is imposed upon the system and motor M and high energy efficiency made possible. By appropriately proportioning, as will now be clear, the values of the various above-described components of the system of my invention, the amount of compensation can be predetermined and, for example, can be made to produce essentially flat speed-torque curves. Good speed regulation at a wide range of selected speeds of drive of motor M can thus be dependably achieved and not only the operation and effectiveness of the driven load L made optimum or maximum but also over-all energy efficiency brought to and maintained at high level.

It will now be clear that, by shifting tap 15 on transformer T–1 in Figure 1, the speed range within which the above actions and advantages of this invention take place may be shifted up or down the permissible speed scale of reasonable or efficient operation of shunt motor M; as is known, with lesser shunt field excitation, the motor armature runs at higher speed, and vice versa. Thus the range of speed change provided by and under control of variable tap 18, with automatic IR drop compensation as above described, may be shifted upwardly or downwardly by corresponding downward or upward setting, by tap 15, of the shunt field excitation.

I may, however, provide a materially enlarged range of speed change throughout which IR drop compensation can be made to take place. Thus, as indicated in Figure 2, I may place shiftable tap 15 under controls such that it shifts commensurately with shift of speed-selecting tap 18, and a simple and illustrative arrangement of this kind is shown in Figure 2. Thus, I may increase excitation of field F of motor M (to lessen the standard of speed regulation) concurrently with lessening of effective D. C. voltage applied to the armature A, and vice versa. A convenient way of doing this is to tie field-rectifier input lead 11 of Figure 1 in with speed-selecting tap 18, for example, as shown in Figure 2 where that lead, indicated at 11$^a$, is connected electrically to speed-selector tap 18.

Accordingly, as tap 18 is shifted, in Figure 2, to set the automatically IR-drop compensated voltage applied to the armature A to a lower value for selection of a lower speed of drive of motor M, the A. C. voltage available for rectification by rectifier R–1 to apply to field F is concurrently and proportionately increased to increase the field excitation of motor M and thus coact with the selected lower armature voltage to set the motor for drive at lower speed. Similarly, reverse shift of tap 18 raises the level of IR-drop compensated applied armature voltage and lowers the level of motor field excitation, both factors coacting additively. Thus the range of motor speed change or adjustment for a given range of available shift of tap 18 is greatly increased. For achieving these range-extending effects, it will now be seen that the just-described circuit and transformer arrangement effects change of transformation ratio in transformer T–1 for one D. C. voltage supply circuit concurrently with inverse change in transformation ratio for the other D. C. voltage supply circuit, with the D. C. armature circuit always automatically compensated for otherwise detrimental voltage drops in the transformer and in the rectifier.

It will thus be seen that there has been provided in this invention an A. C. to D. C. system and apparatus for effecting D. C. motor speed regulation at any of a wide range of selected motor speeds and in which the several objects above noted or indicated are successfully achieved. It will be seen that the system and apparatus are of a thoroughly practical nature, adapted in a simple and efficient way for dependable selection of speed from a readily variable range of motor speeds, and achieve reliable speed regulation for any selected speed, at high energy-efficiency.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:
1. A system for improving the speed regulation of an adjustable-speed direct-current motor comprising an alternating-current supply, a direct-current motor having an armature and a field winding and provided with means for supplying the latter with exciting current, a main transformer having secondary turns, said transformer being energized from said alternating-current supply and having controllable means for adjusting, to any one of a range of voltages, the voltage of its alternating current secondary output, a compensating transformer having a primary winding energized from said supply and having a secondary winding connected in series, aiding, with the secondary turns of said main transformer, a rectifier having its A. C. input supplied with energy by said serially-connected secondary winding and secondary turns, a saturable-core reactor having an inductive winding in series with the primary winding of said compensating transformer to provide a reactive impedance in the circuit of said primary winding, said saturable-core reactor having a flux-control winding thereon which is connected in series with said motor armature to the D. C. output of said rectifier and which, for any selected voltage at the secondary output of said first transformer corresponding to a selected armature speed, varies the impedance of said inductive winding substantially inversely with changes in armature current and thereby varies the aiding output voltage of said compensating transformer secondary winding to maintain substantially constant voltage across said armature.

2. A system for improving the speed regulation of an adjustable-speed direct-current motor comprising an alternating-current supply, a direct-current motor having an armature and a field winding, an auto-transformer having windings energized from said supply and having shiftable tap means providing two alternating-current secondary outputs each of adjustable voltage, said field winding being energized through rectifying means from one of said outputs whereby the standard of motor-field excitation may be changed, a rectifier, a compensating transformer having a primary winding energized from said supply and having a secondary winding, a circuit for energizing the A. C. input of said rectifier having therein said secondary winding connected in series, aiding, with the other adjustable-voltage output of said first transformer, a saturable core reactor having an inductive winding in series with the primary winding of said compensating transformer to provide a reactive impedance in the circuit of said primary winding, said saturable-core reactor havng a flux-control winding thereon which is connected in series with said motor armature to the D. C. output of said rectifier and which, for any selected voltage at the other secondary output of said first transformer corresponding to a selected armature speed, varies the impedance of said inductive winding substantially inversely with changes in armature current and thereby varies the aiding output voltage of said compensating transformer secondary winding to maintain substantially constant voltage across said armature.

3. A system as claimed in claim 2 in which said shiftable tap means comprises two independently controllable taps, one for setting the voltage of the secondary output to set the standard of field-winding excitation and the other for selecting, for any set standard of field excitation, any one of a range of voltages, each for a different desired speed of the armature, of said other adjustable-voltage output of said auto-transformer.

4. A system as claimed in claim 2 in which said shiftable tap means comprise means coacting with said auto-transformer windings for conjointly adjusting the voltages of said two secondary outputs thereof and thereby change both the standard of field-winding excitation and the standard of armature voltage constancy.

References Cited in the file of this patent
UNITED STATES PATENTS

| | | |
|---|---|---|
| 2,482,101 | Cooper | Sept. 20, 1949 |
| 2,625,673 | Sheckels | Jan. 13, 1953 |